(12) United States Patent
Wilton et al.

(10) Patent No.: US 8,734,140 B2
(45) Date of Patent: May 27, 2014

(54) REVERSIBLE GEROTOR PUMP

(75) Inventors: Daryl A. Wilton, Macomb, MI (US);
James M. Hart, Belleville, MI (US);
John C. Schultz, Saline, MI (US);
David R. Staley, Flushing, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 179 days.

(21) Appl. No.: 13/309,427

(22) Filed: Dec. 1, 2011

(65) Prior Publication Data

US 2012/0177520 A1 Jul. 12, 2012

Related U.S. Application Data

(60) Provisional application No. 61/430,526, filed on Jan. 6, 2011.

(51) Int. Cl.
*F04C 14/04* (2006.01)

(52) U.S. Cl.
USPC ............... 418/32; 418/30; 418/166; 418/171

(58) Field of Classification Search
USPC ..................... 418/30–32, 166, 171; 417/315
See application file for complete search history.

(56) References Cited

U.S. PATENT DOCUMENTS

| | | | | |
|---|---|---|---|---|
| 4,193,746 A | * | 3/1980 | Aman, Jr. | 418/32 |
| 4,420,292 A | * | 12/1983 | Lutz | 418/32 |
| 4,660,698 A | * | 4/1987 | Miura | 192/45.016 |
| 6,017,202 A | * | 1/2000 | Durnack et al. | 418/32 |
| 7,220,111 B2 | * | 5/2007 | Johnson | 418/152 |
| 7,278,841 B2 | * | 10/2007 | Phillips | 418/132 |
| 2009/0120392 A1 | * | 5/2009 | Takahashi et al. | 123/90.17 |

* cited by examiner

*Primary Examiner* — Kenneth Bomberg
*Assistant Examiner* — Deming Wan

(57) ABSTRACT

A reversible gerotor pump for a machine having a drive shaft is provided, the pump including a housing, an offset ring, and an inner and outer gear. The offset ring is disposed in the housing and includes a tab extending radially from an outer periphery. The outer periphery of the offset ring defines a first axis in common with the axis of a drive shaft. The inner periphery of the offset ring defines a second axis that is slightly offset from the second axis. The axis of the outer gear moves relative to the axis of the inner gear to allow pumping action in both rotational directions using the same suction and line cavities for both directions.

17 Claims, 3 Drawing Sheets

REVERSIBLE GEROTOR PUMP

CROSS-REFERENCE TO RELATED APPLICATIONS

This application claims the benefit of U.S. Provisional Application No. 61/430,526, filed on Jan. 6, 2011. The disclosure of the above application is incorporated herein by reference.

FIELD

The invention relates generally to a lubrication pump for providing pressurized hydraulic fluid to a transmission, and more particularly to a gerotor pump for use in a transmission.

BACKGROUND

The statements in this section merely provide background information related to the present disclosure and may or may not constitute prior art.

A typical multiple speed transmission uses various pumps and valves to provide high pressure and high flow hydraulic fluid to the various mechanical devices of the transmission; including clutches, brakes, actuators, etc. These pumps and valves are driven by the torque from a driver such as an engine. In typical cases, the clutches, brakes and actuators require constant pressure from the hydraulic fluid source. The fluid source is commonly a pump coupled with at least one valve body to provide constant fluid pressure and flow even when the pump is fluctuating in pressure output and fluid flow direction.

While current hydraulic fluid pumps achieve their intended purpose, the need for new and improved hydraulic pump configurations which exhibit improved performance, unidirectional fluid flow and reduction in accompanying system assemblies is evident. Accordingly, there is a need for an unidirectional, reversible, high pressure and high flow hydraulic fluid pump for a transmission.

SUMMARY

A reversible pump for a machine having a drive shaft is provided, the reversible pump including a housing, an offset ring, an outer gear, an inner gear, and a cover. The housing has a center hub defining a first axis, an outer hub, a first and second radial surface, and a first and second arcuate cavity. The first cavity is disposed on a first side of the center hub and the second cavity is dispose on a second side of the center hub opposite the first side. The outer hub includes a arcuate portion extending radially from an outer periphery of the outer hub, and the first radial surface is disposed adjacent the outer periphery of the outer hub and an inner periphery of the arcuate portion, and the second radial surface is disposed opposite the first radial surface, adjacent the outer periphery of the outer hub and the inner periphery of the arcuate portion. The offset ring is disposed within the outer hub. The offset ring includes a tab extending radially from an outer periphery of the offset ring. The outer periphery of the offset ring defines a second axis and the inner periphery of the offset ring defines a third axis that is offset from the second axis. The outer gear is disposed on the inner periphery of the offset ring. The inner gear is disposed on an inner periphery of the outer gear. The inner gear is splined to the drive shaft for common rotation. The cover has a third and fourth cavity. The third cavity is disposed opposite the first cavity of the housing and the fourth cavity is disposed opposite the second cavity of the housing.

The offset ring is disposed in one of a first and a second position. The first position having the tab of the offset ring disposed in contact with the first radial surface and the second position having the tab of the offset ring disposed in contact with the second radial surface.

In another example of the invention, the tab of the offset ring includes a plurality of bores and a first and second surface. The first surface contacts the first radial surface of the housing when the offset ring is in the first position and the second surface contacts the second radial surface of the housing when the offset ring is in the second position and the bores extend from the first surface of the tab to the second surface of the tab.

In yet another example of the invention, the drive shaft is capable of rotating in either direction.

In yet another example of the invention, the first cavity is a high pressure cavity and the second cavity is a low pressure cavity.

In yet another example of the invention, the arcuate portion of the outer hub extends 180° around the first axis.

In yet another example of the invention, the outer periphery of the outer gear further includes a circumferential groove and the outer periphery of the offset ring includes a circumferential rib disposed in the groove of the outer gear.

In yet another example of the invention, the housing includes a seal disposed in a groove dispose radially outward from the outer periphery of the outer hub.

In yet another example of the invention, the offset ring is capable of rotating approximately 180°.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
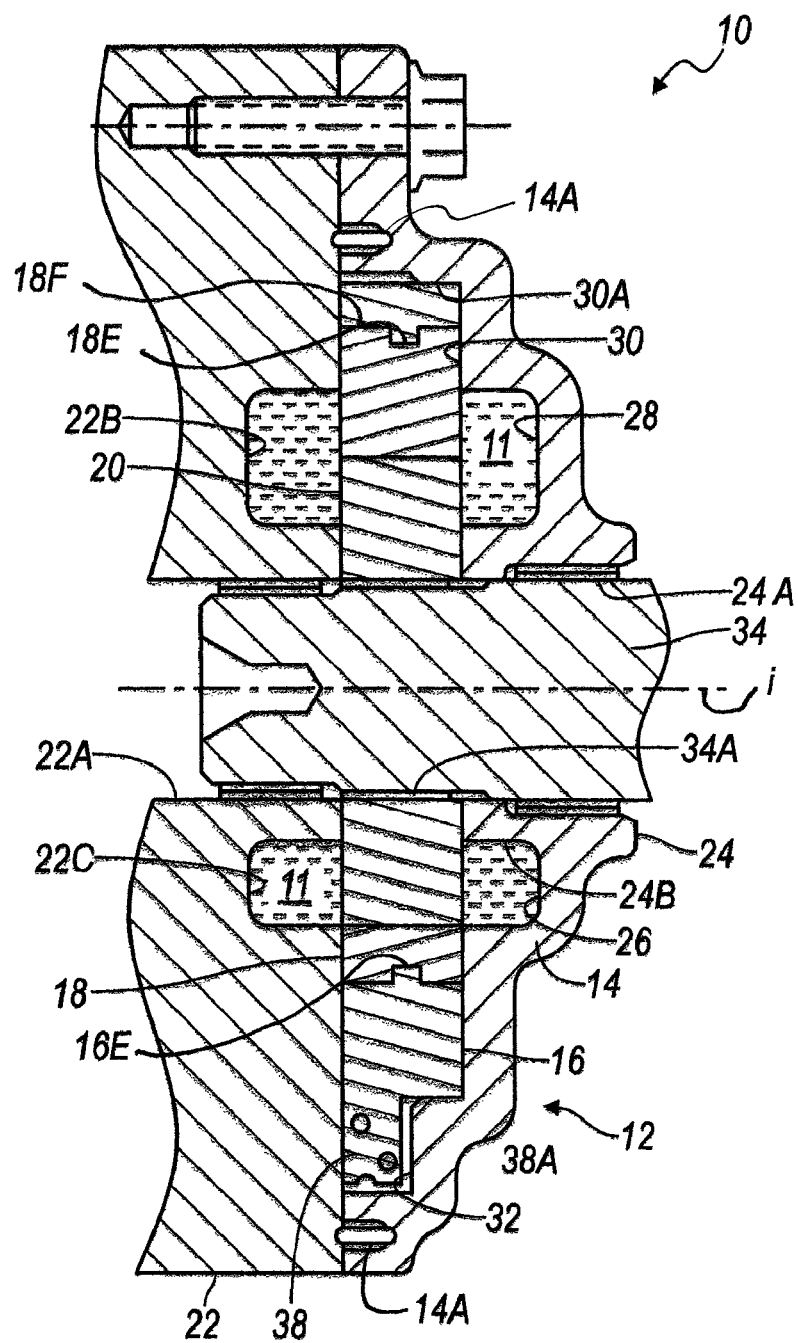
FIG. 1 is a partial cross-sectional view of an example of a reversible gerotor pump as installed in a transmission.

Referring to the drawings, wherein like reference numbers refer to like components, in FIG. 1 an example of reversible gerotor pump 10 installed in a transmission 12 is illustrated. The reversible gerotor pump 10 includes a housing 14, an offset ring 16, an outer gear 18, an inner gear 20 and a cover 22. The gerotor housing 14, filled with hydraulic fluid 11, may be formed as a portion of a housing 14 of the transmission 12. The housing 14 includes an annular shaped center hub 24 defining an axis i, a suction portion 26, a line portion 28, an gear portion 30 and an offset ring portion 32. The hub 24 has an inner periphery 24A through which passes a shaft 34 of the transmission 12. The shaft 34 can be an input, output or intermediate shaft without departing from the scope of the invention. The suction portion 26 is a crescent-shaped relief disposed proximate an outer periphery 24B of the hub 24 that communicates with a hydraulic fluid return port (not shown)

of the transmission 12. The suction portion 26 extends partially around the outer periphery 24B of the hub 24. The line portion 28 is a crescent-shaped relief disposed proximate the outer periphery 24B of the hub 24 that communicates with a hydraulic fluid supply port (not shown) of the transmission 12. Similar to the suction portion 26, the line portion 28 extends partially around the outer periphery 24B of the hub 24, however, the line portion 28 is disposed opposite the suction portion 26 and there is no overlap between the suction portion 26 and line portion 28. Further description of the disposition of the suction and line portions 26, 28 is found below. The gear portion 30 of the housing 14 overlaps the hub, suction and line portions 24, 26, 28. The gear portion 30 is open to an outer surface 34A of the shaft 34 allowing for interconnection between the shaft 34 and the inner gear 20 for common rotation. The offset ring portion 32 is disposed on an outer periphery 30A of the gear portion 30, however, it extends approximately 180° around the outer periphery 30A of the gear portion 30. One end of the offset ring portion 32 includes a forward stop 32A and the opposite end includes a reverse stop 32B. The stops 32A, 32B are radially extending walls that are aligned approximately at a midpoint of the suction and line portions 26, 28, respectively. The cover 22 includes a hub 22A, a line portion 22B and suction portion 22C. The cover 22 is disposed such that the hub 22A receives the shaft 34 of the transmission 12 and the line portion 22B and suction portion 22C align with the line portion 28 and suction portion 26 of the housing 14, respectively.

Figure 2:
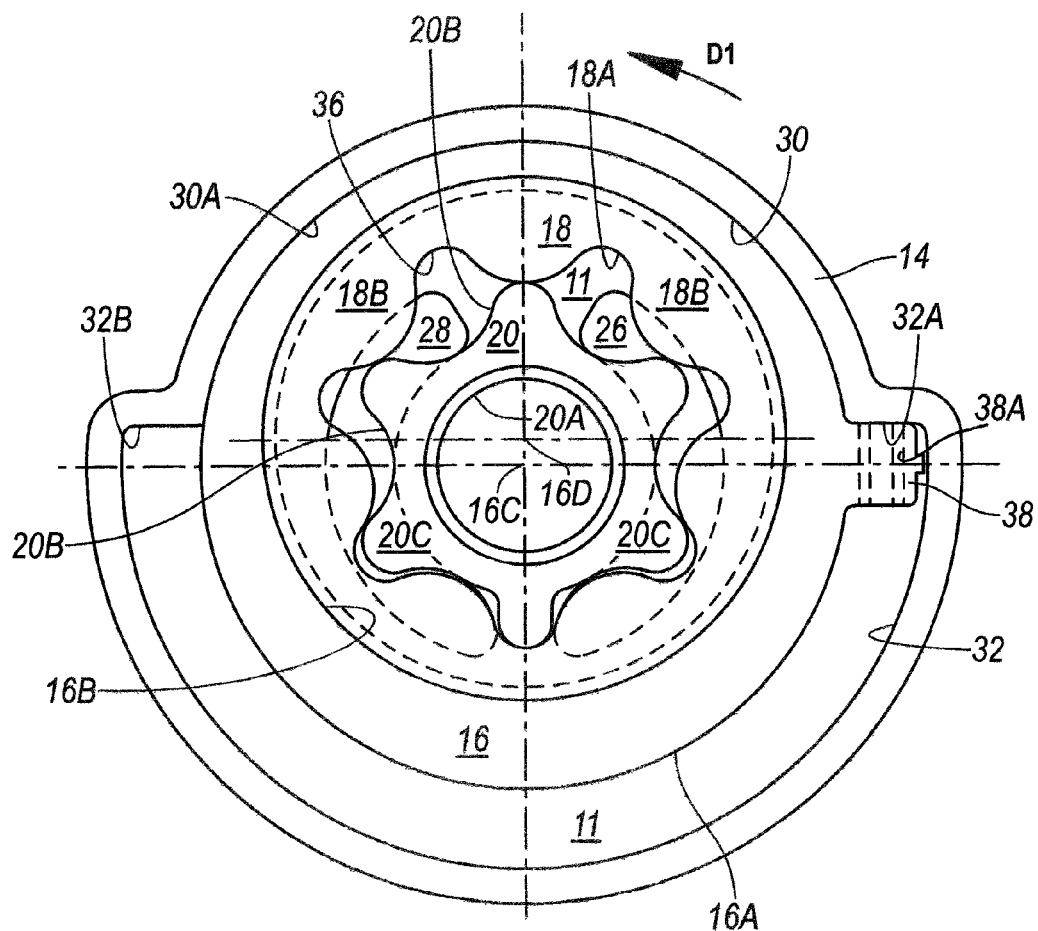
FIG. 2 is an axial view of an example of a reversible gerotor pump rotating in a clockwise or first direction.
Figure 3:
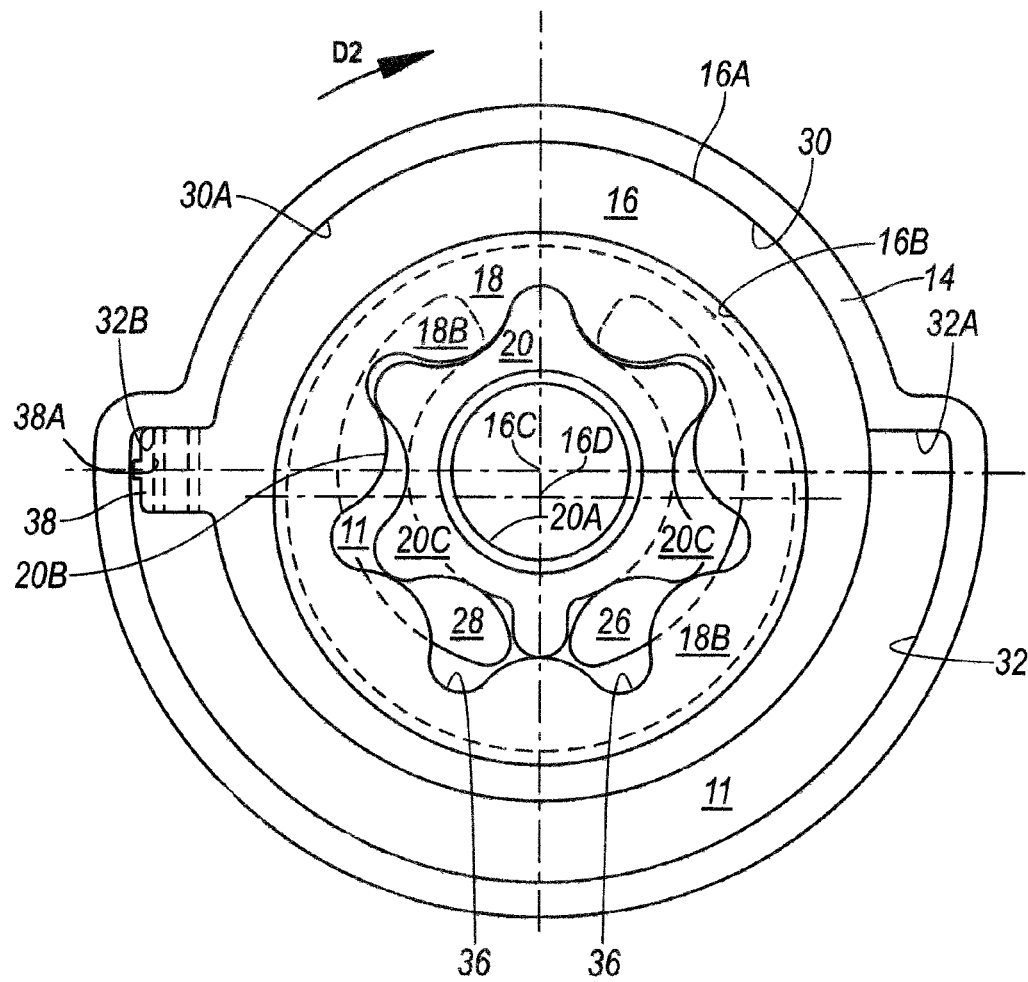
FIG. 3 is an axial view of an example of a reversible gerotor pump rotating in a counterclockwise or second direction.

The inner gear 20 has a splined inner surface 20A that meshes with a splined outer surface 34A of the transmission shaft 34 for a solid connection allowing the inner gear 20 to rotate with the shaft 34. Referring now to FIGS. 2 and 3, the gerotor is shown in an axial view with the cover 22 removed. An outer periphery 20B of the inner gear 20 includes, for example, six teeth 20C but may have more or less teeth. The outer gear 18 has an inner periphery 18A that includes, for example, seven teeth 18B and an outer periphery 18F that includes a circumferential groove 18E. In general, the number of teeth on the inner gear 20 is always one less than the number of teeth on the outer gear 18. The teeth 20B of the inner gear 20 mesh with the teeth 18B of the outer gear 18 to create a plurality of pockets 36 of variable volume between the gears 18, 20. As the inner gear 20 rotates relative to the outer gear 18, the pockets 36 increase in volume as they pass over the suction portion 26 of the housing 14 and decrease in volume as they pass over the line portion 28 of the housing 14. As the pocket 36 volume increases, decreased pressure in the pocket 36 draws or sucks hydraulic fluid 11 into the pocket 36 from the suction portion 26. As the pocket 36 volume decreases over the line portion 28, increased pressure in the pocket 36 forces the hydraulic fluid 11 into the line portion 28 of the housing 14 and therefore the supply line of the transmission 12.

The offset ring 16 is an annular ring having an outer periphery 16A from which a tab portion 38 extends radially. The tab portion 38 of the offset ring 16 is disposed in the offset ring portion 32 of the housing 14. The tab portion 38 may also include holes, channels or specified clearances 38A with the housing 14. As is explained below, the tab portion 38 moves through the offset portion 32 of the housing 14. The clearances, holes or channels 38A in the tab portion 38 can be tailored to vary the damping effect the hydraulic fluid 11 in the offset portion 32 of the housing as the offset ring 16 rotates. Additionally, while the outer periphery 16A defines a circle that fits within the inner periphery 30A of the gear portion 30 of the housing 14, an inner periphery 16B of the offset ring 16 defines a circle including a center 16D that is slightly offset from a center 16C of the circle defined by the outer periphery 16A of the offset ring 16. Additionally, the inner periphery 16B of the offset ring includes a circumferential rib 16E that is disposed in the circumferential groove 18E of the outer gear 18. The two offset centers 16C, 16D allow the offset ring 16 to have a variable thickness. The variable thickness forces the outer gear 18 to have the same axis of rotation as the inner periphery 16B of the offset ring 16.

As stated above, the inner gear 20 is connected to the shaft 34 that passes through the hub 24 of the housing 14. The outer gear 18 is disposed on the outer periphery 20B of the inner gear 20 and the offset ring 16 is disposed on the outer periphery 20 of the outer gear 18C with the tab portion 38 of the offset ring 16 disposed in the offset ring portion 32 of the housing 14. Further, the outer diameter of the outer gear 18 is the same or slightly smaller than the inner diameter of the offset ring 16. Therefore, the position of the rotational axis of the outer gear 18 relative to the inner gear 20 is controlled by the rotational position of the offset ring 16. When the offset ring 16 is in a forward or first position as in FIG. 2, the tab 38 of the offset ring 16 is in contact with the forward stop 32A of the housing 14 and the center 16D of the outer gear 18 is on a first side of the center 16C of the inner gear 20. As the rotation of the shaft 34 changes to a reverse or clockwise direction D2 as in FIG. 3, the offset ring 16 is in a reverse or second position and the center 16D of the outer gear 18 is on a second side of the center 16C of the inner gear 20 opposite of the first side. Without the shift in the center 16D or rotation of the outer gear 20 upon a change in direction of the inner gear 18, the pockets 36 between the gears 18, 20 would increase in volume over the line portion 28 of the housing 14 and decrease in volume over the suction portion 26 of the housing 14 thus reversing flow of hydraulic fluid 11. However, as the offset ring 16 shifts the center 16D of rotation of the outer gear 18, the variable volume pockets 36 maintain the same pressure changes as when the shaft 34 is moving in the first or forward direction D1.

The description of the invention is merely exemplary in nature and variations that do not depart from the gist of the invention are intended to be within the scope of the invention. Such variations are not to be regarded as a departure from the spirit and scope of the invention.

What is claimed is:

1. A reversible pump for a machine having a drive shaft, the pump including:
    a housing having a center hub defining a first axis, a gear portion, a forward stop radial wall, a reverse stop radial wall, a suction portion, a line portion, wherein the suction portion is disposed on a first side of the center hub and the line portion is dispose on a second side of the center hub opposite the first side, and the gear portion includes an offset ring portion extending radially from an outer periphery of the gear portion, and the forward stop radial wall is disposed adjacent the outer periphery of the gear portion and an inner periphery of the offset ring portion, and the reverse stop radial wall is disposed opposite the forward stop radial wall, adjacent the outer periphery of the gear portion and the inner periphery of the offset ring portion;
    an offset ring disposed within the gear portion, the offset ring including a tab extending radially from an outer periphery of the offset ring, wherein the outer periphery of the offset ring defines a second axis and the inner periphery of the offset ring defines a third axis that is offset from the second axis;

an outer gear disposed on the inner periphery of the offset ring;

an inner gear disposed on an inner periphery of the outer gear, wherein the inner gear is splined to the drive shaft for common rotation; and a cover having a line portion and a suction portion, wherein the line portion of the cover is disposed opposite the line portion of the housing and the suction portion of the cover is disposed opposite the suction portion of the housing; and wherein the tab of the offset ring includes a plurality of channels and a first and second surface, the offset ring is disposed in one of a first and a second position, the first surface of the tab contacts the forward stop wall of the housing when the offset ring is in the first position and the second surface of the tab contacts the reverse stop wall of the housing when the offset ring is in the second position and the plurality of channels extend from the first surface of the tab to the second surface of the tab.

2. The reversible pump of claim 1 wherein the drive shaft is capable of rotating in either direction.

3. The reversible pump of claim 1 wherein the line portion is a high pressure cavity and the suction portion is a low pressure cavity.

4. The reversible pump of claim 1 wherein the offset ring portion of the outer hub extends 180° around the first axis.

5. The reversible pump of claim 1 wherein the outer periphery of the outer gear further includes a circumferential groove and the outer periphery of the offset ring includes a circumferential rib disposed in the groove of the outer gear.

6. The reversible pump of claim 1 wherein the housing includes a seal disposed in a groove dispose radially outward from the outer periphery of the gear portion.

7. The reversible pump of claim 1 wherein the offset ring is capable of rotating approximately 180°.

8. A reversible pump for a machine having a drive shaft, the pump including:

a housing having a center hub defining a first axis, a gear portion, a forward stop radial wall, a reverse stop radial wall, and a suction portion, a line portion, wherein the suction portion is disposed on a first side of the center hub and the line portion is dispose on a second side of the center hub opposite the first side, and the gear portion includes an offset ring portion extending radially approximately 180° around the first axis from an outer periphery of the gear portion, and the forward stop radial is disposed adjacent the outer periphery of the gear portion and an inner periphery of the offset ring portion, and the reverse stop radial wall is disposed opposite the forward stop radial wall, adjacent the outer periphery of the gear portion and the inner periphery of the offset ring portion;

an offset ring disposed within the gear portion, the offset ring including a tab extending radially from an outer periphery of the offset ring, wherein the outer periphery of the offset ring defines a second axis and the inner periphery of the offset ring defines a third axis that is offset from the second axis and the tab of the offset ring includes a plurality of channels and a first and second surface;

an outer gear disposed on the inner periphery of the offset ring;

an inner gear disposed on an inner periphery of the outer gear, wherein the inner gear is splined to the drive shaft for common rotation; and a cover having a line portion and a suction portion, wherein the line portion of the cover is disposed opposite the line portion of the housing and the suction portion of the cover is disposed opposite the suction portion of the housing; and wherein the offset ring is disposed in one of a first and a second position, the first position having the tab of the offset ring disposed in contact with the forward stop wall and the second position having the tab of the offset ring disposed in contact with the reverse stop wall.

9. The reversible pump of claim 8 wherein the first surface of the tab contacts the forward stop wall of the housing when the offset ring is in the first position and the second surface of the tab contacts the reverse stop wall of the housing when the offset ring is in the second position and the bores extend from the first surface of the tab to the second surface of the tab.

10. The reversible pump of claim 9 wherein the drive shaft is capable of rotating in either direction.

11. The reversible pump of claim 10 wherein the line portion is a high pressure cavity and the suction portion is a low pressure cavity.

12. The reversible pump of claim 11 wherein the outer periphery of the outer gear further includes a circumferential groove and the outer periphery of the offset ring includes a circumferential rib disposed in the groove of the outer gear.

13. A reversible pump for a machine having a drive shaft, the pump including:

a housing having a center hub defining a first axis, a gear portion, a forward stop radial wall, a reverse stop radial wall, and a suction portion, a line portion, wherein the suction portion is disposed on a first side of the center hub and the line portion is dispose on a second side of the center hub opposite the first side, and the gear portion includes an offset ring portion extending radially approximately 180° around the first axis from an outer periphery of the gear portion, and the forward stop radial wall is disposed adjacent the outer periphery of the gear portion and an inner periphery of the offset ring portion, and the reverse stop radial wall is disposed opposite the forward stop radial wall, adjacent the outer periphery of the gear portion and the inner periphery of the offset ring portion;

an offset ring disposed within the gear portion, the offset ring including a tab extending radially from an outer periphery of the offset ring, wherein the outer periphery of the offset ring defines a second axis and the inner periphery of the offset ring defines a third axis that is offset from the second axis;

an outer gear disposed on the inner periphery of the offset ring;

an inner gear disposed on an inner periphery of the outer gear, wherein the inner gear is splined to the drive shaft for common rotation; and a cover having a line portion and a suction portion, wherein the line portion of the cover is disposed opposite the line portion of the housing and the suction portion of the cover is disposed opposite the suction portion of the housing; and wherein the tab of the offset ring includes a plurality of channels and a first and second surface, the offset ring is disposed in one of a first and a second position, the first surface of the tab contacts the forward stop wall of the housing when the offset ring is in the first position and the second surface of the tab contacts the reverse stop wall of the housing when the offset ring is in the second position and the plurality of channels extend from the first surface of the tab to the second surface of the tab.

14. The reversible pump of claim 13 wherein the drive shaft is capable of rotating in either direction.

15. The reversible pump of claim 13 wherein the line portion is a high pressure cavity and the suction portion is a low pressure cavity.

16. The reversible pump of claim 13 wherein the outer periphery of the outer gear further includes a circumferential groove and the outer periphery of the offset ring includes a circumferential rib disposed in the groove of the outer gear.

17. The reversible pump of claim 13 wherein the housing includes a seal disposed in a groove dispose radially outward from the outer periphery of the gear portion.

* * * * *